United States Patent [19]

Rich et al.

[11] Patent Number: 4,651,161

[45] Date of Patent: Mar. 17, 1987

[54] DYNAMICALLY VARYING THE PRESSURE OF FLUID TO AN INK JET PRINTER HEAD

[75] Inventors: Leonard G. Rich, West Hartford; Dale G. Blake, Tolland, both of Conn.

[73] Assignee: Metromedia, Inc., Del.

[21] Appl. No.: 820,520

[22] Filed: Jan. 17, 1986

[51] Int. Cl.⁴ .............................................. G01D 15/18

[52] U.S. Cl. ....................................... 346/1.1; 346/75; 346/140 R

[58] Field of Search ........................ 346/1.1, 75, 140 R

[56] References Cited

U.S. PATENT DOCUMENTS

| | | | |
|---|---|---|---|
| 4,045,770 | 8/1977 | Arnold et al. | 346/75 |
| 4,314,263 | 2/1982 | Carley | 346/140 R |
| 4,535,339 | 8/1985 | Horike et al. | 346/75 |
| 4,562,445 | 12/1985 | Rich | 346/140 R |

*Primary Examiner*—E. A. Goldberg

*Assistant Examiner*—Gerald E. Preston

*Attorney, Agent, or Firm*—McCormick, Paulding & Huber

[57] ABSTRACT

A hydraulic circuit and related method are provided for dynamically varying the pressure of ink supplied to an ink jet printer head to obtain consistent volume ejected ink drops despite differences in the time elapsing between successive drops. A dot rate command signal related to an actuation frequency and corresponding to the pressure of ink at the head necessary for producing an ejected drop having a desired volume is compared with the ink pressure at the head to produce a pressure control signal for varying the pressure of the ink in a variable volume fluid chamber to deliver ink to the head at the desired pressure. The pressure control signal is one chosen by experiment as that required to produce the desired ink drop volume for the specific ink supply and ink jet printer head employed.

6 Claims, 3 Drawing Figures

DYNAMICALLY VARYING THE PRESSURE OF FLUID TO AN INK JET PRINTER HEAD

BACKGROUND OF THE INVENTION

This invention relates to ink jet printers and deals more particularly with an improved apparatus or hydraulic circuit and related method for dynamically varying the pressure of writing fluid supplied to an ink jet printer head having an electrically energizable, activating element such as a piezoelectric In an ink jet printer a receiving surface on which a graphic is to be created is moved relative to one or more ink jet printer heads in a line scanning fashion. As each printer head moves along a scan line, it moves past a succession of points on the line in relation to each of which the printer head may eject a drop of a writing fluid such as ink, paint, pigmented ink, etc. which lands on and prints a dot at the position. In one type of printer head the head is actuated for each potential print point on the scan line, to eject a drop of ink for each such position, and then the drop is electrostatically controlled during its flight from the printer head to the receiving surface to either direct it onto the receiving surface or away from the receiving surface depending on whether the scan line point in question is to be printed or not. In such a printer head the actuation frequency, or the time between successive actuations, is dependent on the speed of the printer head along the scan line. That is, the actuation frequency, or the time between successive actuations, will change if changes are made in the speed of the printer head relative to the receiving surface.

In another type of printer head, referred to as a "drop-on-demand" printer head, as the printer head is moved along a scan line it is actuated to produce a drop of ink only for those potential print positions along the scan line onto which the printing of dots is wanted. Therefore, the amount of time elapsing between successive actuations is dependent not only on the speed of the printer head relative to the receiving surface, but also on the pattern in accordance to which dots are to be printed along the scan line.

In either type of printer head described above, after a drop is ejected from the head, it travels for some distance in free flight from the printer head to the receiving surface along a trajectory path dependent on the velocity at which the drop is ejected. Changes in the ejected velocity therefore change the location at which a drop strikes the receiving surface and are quite undesirable.

Another significant factor contributing to the generation of quality graphics relates to the consistency of the size of printed dots along the scan line as the actuation frequency of the ink jet head changes. For good printing, all ejected drops should be of substantially the same volume so that all dots printed on the receiving surface by the separate drops are of substantially consistent size.

Because of fluid and mechanical dynamics involved in the actuation of a printer head, including resonances and other phenomena, the ejected drop velocity and volume varies widely in many printer heads with the changes in the actuation frequency or the time elapsing between successive actuations. This may be somewhat troublesome in the use of electrostatically deflected printer heads in the cases where the printer head is moved at different speeds relative to the receiving surface. It is, however, particularly troublesome in the case of "drop-on-demand" printer heads in which the inherent operation of the printer involves a wide range in the elapsed time occurring between successive pulses. That is, while scanning a line during one portion of the line, the printer head may be actuated to print the dot at every potential print point, in which case a very short elapsed time occurs between successive actuations, and along other portions of the line, the printer head may be actuated to print the dot only at some occasional potential print points in which case the time elapsing between successive actuations is considerably lengthened. In the case of large volume "drop-on-demand" ink jet printer heads which produce dots having a printed size ranging from 0.02 inches to 0.05 inches or larger, the fluid and mechanical dynamics tend to limit the rate at which drops having substantially the same volume and constant velocity are ejected from the printer head. Consequently, the receiving surface area coverage per unit time is generally reduced to compensate for printer head and ink supply limitations to produce quality graphics generated by printing dots of substantially the same size.

In a co-pending patent application entitled "METHOD AND APPARATUS FOR DRIVING AN INK JET PRINTER", U.S. Ser. No. 634,499, filed July 26, 1984, now U.S. Pat. No. 4,562,445 and assigned to the same assignee as the present invention, a driving circuit for an ink jet printer head is disclosed for causing the printer head to eject drops at a constant velocity despite changes in the time elapsing between successive actuations to compensate for the various system resonances of the ink jet printer head and its associated writing fluid supply system at the frequencies which might otherwise represent nonproductive dot generation by the ink jet printer head.

Although the above-described driving circuit overcomes substantially the problems of nonproductive dot generation due to fluid and mechanical dynamics, the maximum dynamic range over which dots are produced is further limited by the drop in the pressure of ink within the ink jet head piezo cavity. At higher dot generation rates the volume of an ejected drop and consequently, the size of the printed dot associated with the drop is generally not equal to the volume of an ejected drop and the size of the printed dot produced at lower dot production rates. The limited dynamic range of dot production is most noticeable in periods of very rapid successive actuations of the ink jet head after a period of no or relatively low dot production rates. One reason is that the ink jet head piezo cavity is ink starved at the higher dot production rates because ink is ejected from the head faster than it is supplied from the ink source. This is especially troublesome during transitions from low to high dot production rates because the dots printed are not of substantially consistent size due to the varying ink volume in the ejected ink drops and the quality of the graphic produced is degraded.

The object of the present invention is, therefore, to provide a hydraulic circuit, particularly useful with "drop-on-demand" printer heads, but also useful with electrostatically deflected ink jet printer heads, for dynamically varying the pressure of ink supplied to an ink jet printer head from an ink supply.

Another object of the invention is to provide a hydraulic circuit to supply ink to an ink jet printer head so that drops of a substantially constant volume are ejected despite changes in the time elapsing between successive actuations.

SUMMARY OF THE INVENTION

In accordance with the present invention, a circuit varies the pressure of writing fluid, such as pigmented ink, supplied to an ink jet printer head in response to timing pulses from a controller or other device in which circuit the timing pulses are associated with the instantaneous actuation frequency of the printer head and correspond to the desired ink pressure at the head required to eject ink drops of consistent volume. Ink is supplied to the ink jet head from a fluid chamber having pressure producing means for changing the pressure of the ink in the chamber and ink is fed to the chamber under pressure from an ink source. A pressure sensor is located between the fluid chamber and the ink jet head and senses the pressure of ink at the head. The sensor produces a signal representative of the sensed pressure at the head and the sensed pressure is compared to the desired pressure to produce a pressure modulating signal. The pressure modulating signal is used to excite drive means coupled to the fluid chamber pressure producing means to vary the pressure of ink in the fluid chamber. The fluid chamber ink pressure is related to the actuation frequency and changes in the actuation frequency produce corresponding changes in the chamber ink pressure to supply ink to the ink jet head at the desired pressure.

BRIEF DESCRIPTION OF THE DRAWINGS

Other features and advantages of the invention will be apparent from the following description and claims taken in conjunction with the accompanying drawings wherein:

DETAILED DESCRIPTION OF THE PREFERRED EMBODIMENTS

The ink supply pressure varying circuit of the invention may be applied to a ink jet printer head forming part of any one of a wide variety of ink jet printers. The printer head may, for example, be the only printer head of the printer or it may be one of a plurality of printer heads included in the printer with various ones of the heads ejecting drops of different color to produce colored graphics. Also, the size of the printer head and of the entire printer may very widely as may the method used for achieving relative scanning movement between the printer head or heads and the receiving surface.

Figure 1:
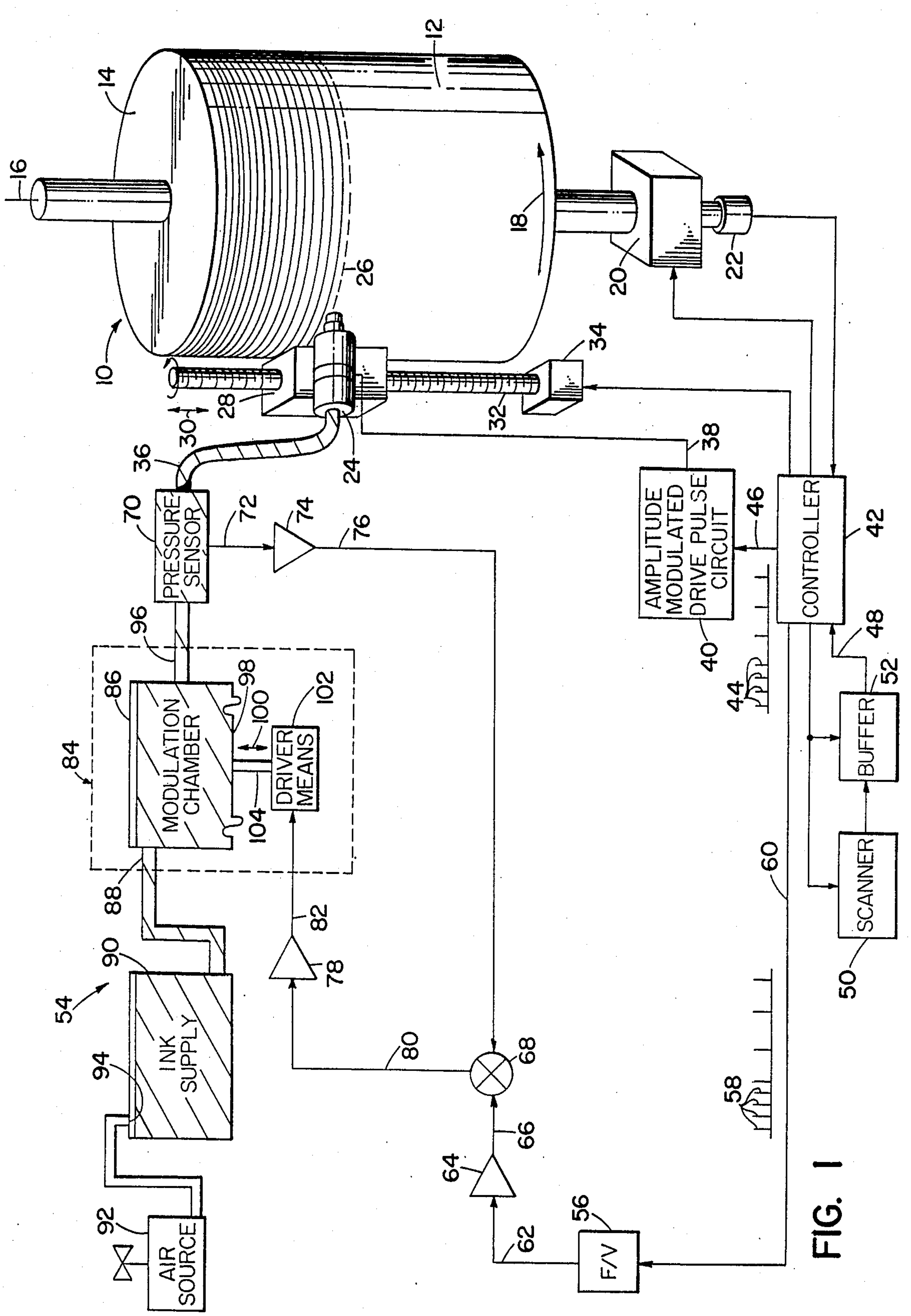
FIG. 1 is a schematic diagram partially in block diagram form showing an ink printer having an ink supply embodying the invention.

By way of example, FIG. 1 shows an ink jet printer, indicated generally at 10, wherein the receiving surface 12 is located on the outside of a cylindrical drum 14 supported for rotation about a vertical axis 16. The drum 14 is driven in rotation, in the direction indicated by the arrow 18, about the vertical axis 16 by a drive motor 20 and the angular position of the drum with respect to the axis 16 is detected by an encoder 22. An ink jet printer head 24 is positioned to eject ink drops onto the receiving surface 12. As the drum 14 is rotated, the printer head 24 is moved slowly downwardly so that with each revolution of the drum, the printer head scans a new line 26 on the receiving surface 12, each scan line actually being one convolution of a continuous helical line. To achieve this downward motion, the printer head 24 is mounted on a carriage 28 and driven in the vertical direction, indicated by the arrow 30, by a lead screw 32 rotated by a drive motor 34. Ink is supplied to the printer head through a tube 36 connected to a pressure varying circuit embodying the present invention and described herein below. Electrical power for actuating the printer head is supplied to it through a set of electrical conductors 38, the conductors more particularly being connected to a piezoelectric activating element forming a part of the printer head. The source of drive signals for activating the printer head 24 may vary widely, but preferably and by way of example, the source may be similar to that shown in the above-referenced patent application, U.S. Ser. No. 634,499 filed July 26, 1984 in the name of Leonard G. Rich, entitled APPARATUS AND METHOD FOR DRIVING INK JET PRINTER, now U.S. Pat. No. 4,562,445 the disclosure of which application is incorporated herein by reference and to which application reference may be made for further details of the driving circuit.

The construction of the printer head 24 may vary widely, but preferably and by way of example, the construction may be similar to that shown in the U.S. patent application Ser. No. 637,163 filed Aug. 2, 1984 in the name of Leonard G. Rich, entitled INK-DROP EJECTING HEAD, now U.S. Pat. No. 4,599,626 the disclosure of which application is incorporated herein by reference and to which application reference may be made for further details of the printer head, which printer head is one having a piezoelectric activating element and is intended to eject relatively large volume ink drops adapting it to use in relatively large printers for producing large scale graphics such as billboards and display signs.

In FIG. 1 the printer 10 is controlled by a controller 42 receiving signals from the encoder 22 and furnishing signals to the drive motors 20 and 34 creating and controlling the relative motion between the receiving surface 12 and the ink jet printer 24. The controller 42 is also responsive to input video signals or the like in response to which timing signals, such as indicated at 44, are output on the line 46. The timing signals 44 are very short duration pulses each of which dictates one actuation of the ink jet printer head 24. The controller 42 generates the timing pulses in synchronism with the relative movement between the receiving surface 12 and the printer head 24 so that each time the printer head is moved to a new potential print position, a timing pulse 44 is created or not depending whether or not an ink dot is to be printed at that position. The time elapsing between successive timing pulses 44 may vary and the minimum amount of time between any two successive timing pulses is related to the maximum relative speed between the receiving surface 12 and the printer head and the spacing between the centers of successive potential print positions along the scan line, both of which may also vary. By way of example, in the system of FIG. 1 it is taken that the spacing between the centers of potential print positions along the scan line is such that at the maximum speed of the receiving surface relative to the printer head, the printer head has to be actuated at a frequency of 4 Kilohertz to print the dot at each potential print position, thereby making the minimum elapsed time between two successive timing pulses 44, 0.25 milliseconds.

The video signal to which the controller 42 is responsive is in the illustrated case supplied to the controller through the line 48 and may come from various different sources, the illustrated source being an optical scanner 50 connected with the controller 42 through a buffer 52. The scanner 50 may be an optical laser scanner which scans a continuous tone negative mounted on a drum. At the beginning of each revolution of the drum 14 the scanner 48 is operated to rotate its drum at a faster rate than the drum 14 to scan one line on the associated negative, the information derived and relating to the one scan line being sent to the buffer 52 which temporarily stores it in a push down list storing a number of lines of information. Also, at the start of each revolution of the drum 14, the controller extracts information, that is, the video signal, for a scan line from the bottom of the pushdown list of the buffer and uses that information to generate the timing signals 44, so that through the intermediary of the buffer 52 the printer 10 and scanner 50 operate simultaneously in an online fashion.

In accordance with the invention, a pressure varying circuit, indicated 54 in FIG. 1, is provided for maintaining the pressure of the ink supplied to the printer head 24 at a desired pressure correlating to an associated actuation frequency. The actuation frequency is related to the timing pulses 44 and the pressure of the ink at the printer head 24 is controlled so that ink drops of consistent volume are ejected from the printer head despite the differences in the elapsed time between successive timing pulses. The circuit 54 is such that in response to a dot rate command signal which signal is related to the instantaneous rate at which dots are ejected from the ink jet printer head 24 and representative of the desired ink pressure is produced and compared to a signal representative of the actual ink pressure at the ink jet head. The difference between the desired pressure and actual pressure is used to produce an error signal and the error signal is used to vary the pressure of the ink supplied to the printer head to make the actual pressure equal to the desired pressure. In actuality, it is the pressure within the piezo cavity of the printer head that is varied in accordance with the actuation frequency. However, as a practical matter, it is not as complicated or difficult to sense the ink pressure at the input to the ink jet head as compared to sensing the pressure within the cavity. Through experimentation, the relationship between the pressure at the input and within the piezo cavity is determined for each actuation frequency and the determined pressure at the input is the desired pressure produced by the circuit 54 to produce ink drops having a consistent volume.

The ink supply pressure varying circuit 54 illustrated in FIG. 1 includes a frequency-to-voltage converter 56 that receives pulses 58 on the line 60 from the controller 42. The pulses 58 are related to the timing pulses 44 and represent the dot rate-pressure information. The frequency-to-voltage converter 56 in response to the pulses 58 produced by the controller 42 generates an analog signal that is representative of the desired ink pressure at the ink jet head for the instantaneous dot generation rate for the sequence of drops about to be ejected from the head. A buffer amplifier 64 is connected to the output 62 of the converter 56 and receives the analog output signal from the converter 56. The output 66 of the buffer 64 is fed to one input of a comparator 68.

A pressure sensor 70 senses the ink pressure in the ink supply tube 36 connected to the printer head 24 and produces a signal at its output 72 representative of the ink pressure at the input to the printer head. The signal on the output lead 72 is fed to the input of a buffer amplifier 74 and the amplifier has its output 76 connected to another input of the comparator 68. The pressure sensor signal on lead 76 supplied to the comparator 68 is representative of the ink pressure at the printer head 24 for the immediately preceding sequence of drops ejected from the printer head. Thus, the immediate prior history of the ink pressure as represented by the signal on lead 76 is compared to the desired ink pressure as represented by the signal on lead 66 for the next sequence of drops to be ejected from the printer head. The signal on lead 66 corresponds to the ink pressure required at the printer head to eject a drop having a desired volume at the commanded actuation frequency. The output of the comparator 68 on the lead 80 is an error signal representative of the difference, if any, between the ink pressure at the printer head 24 for the immediately preceding sequence of ejected drops and the pressure associated with the sequence of drops about to be ejected. The error signal is fed to the input of a buffer amplifier 78 which amplifier output 82 is coupled to a hydraulic/pneumatic pressure control mechanism indicated generally within the dotted line box 84. The amplifier 78 produces a driving signal representative of the difference between the desired and actual ink pressures to cause the pressure control mechanism 84 to increase the pressure of the ink supplied to the printer head in accordance with the magnitude of the driving signal.

The construction of the pressure control mechanism 84 may vary widely and may be comprised of several hydraulic and/or pneumatic elements which operate cooperatively to produce the desired ink pressure at the printer head 24 and the mechanism operates over a frequency range of zero to at least a hundred Hertz or more. Preferably, and by way of example, the construction of the pressure control mechanism may be similar to that shown in the U.S. patent application Ser. No. 820,241 filed concurrently herewith in the names of Leonard G. Rich and Dale G. Blake, entitled HYDRAULIC SERVOMECHANISM FOR CONTROLLING THE PRESSURE OF WRITING FLUID IN AN INK JET PRINTING SYSTEM, the disclosure of which application is incorporated herein by reference and to which application reference may be made for further details of the pressure servo. The pressure servo disclosed in the application is one having a frequency response in the range of zero to approximately 400 Hertz.

The pressure control mechanism 84 shown schematically in FIG. 1 comprises a variable volume fluid chamber 86 having an input 88 connected to the output of an ink supply 90. The ink supply 90 is pressurized from an air source 92 at a predetermined pressure supplied to an inlet 94 of the supply 90. The fluid chamber output 96 is coupled to the printer head inlet supply tube 36 and the pressure sensor 70. In the illustrated example, the fluid chamber 86 includes a diaphragm member 98 coupled to a driving mechanism 102 via a connecting member 104 and the diaphragm is arranged for reciprocating movement to vary the pressure in the chamber by varying the volume of the chamber and varying the compression of the ink within the chamber. The driver 102 is responsive to signals on the lead 82 and moves the member 104 and the attached diaphragm 98 to vary the pressure of the ink in the chamber 86. As more pressure is required, the driver 102 in response to the driving signal on lead 82 exerts more force on the diaphram 98 to compress the ink in the chamber 86 and accordingly increases the pressure of the ink supplied to the ink jet head.

Figure 2:
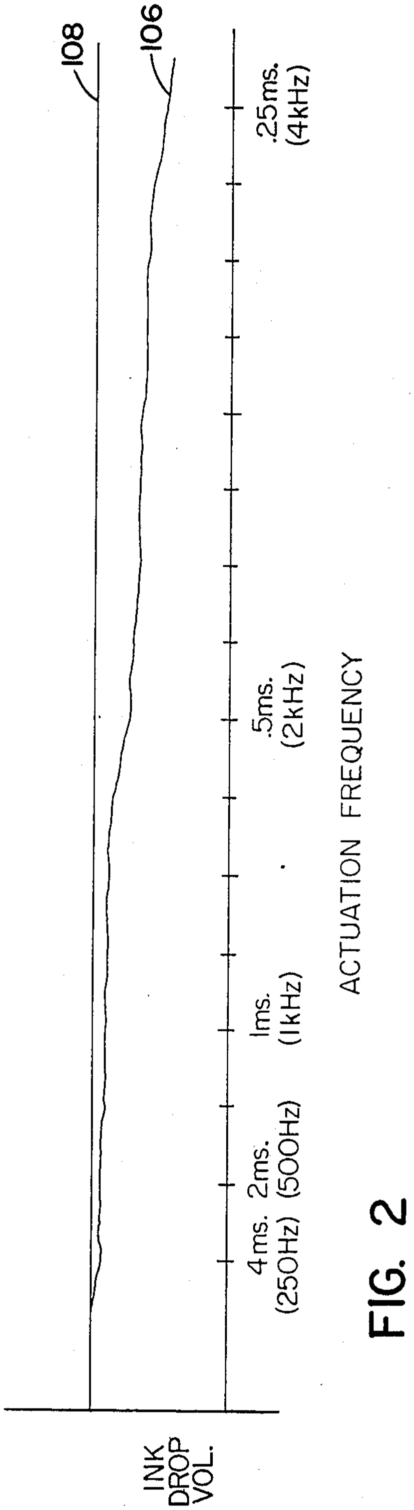
FIG. 2 is a diagram showing a representative relationship between ink drop volume and actuation frequency for one specific ink jet printer head.

The result of the circuit 54 of FIG. 1 may be explained by reference to FIGS. 2 and 3. In FIG. 2 the line 106 represents a typical response characteristic showing the performance of an ink jet printer head at different elapsed times between successive actuations, that is, at different actuation frequencies and without pressure compensation of the ink supplied to the ink jet head. From this curve 106 it is seen that the volume of an ejected drop varies considerably with elapsed time between actuations with the drop volume being substantially reduced at higher actuation frequencies. A desirable response characteristic is represented by the straight line 108 and is representative of the performance achieved using the hydraulic circuit of this invention. That is, in the case of the reponse characteristic 108, the volume of an ejected ink drop remains constant over the full range of elapsed times between successive pulses or actuating frequencies.

Figure 3:
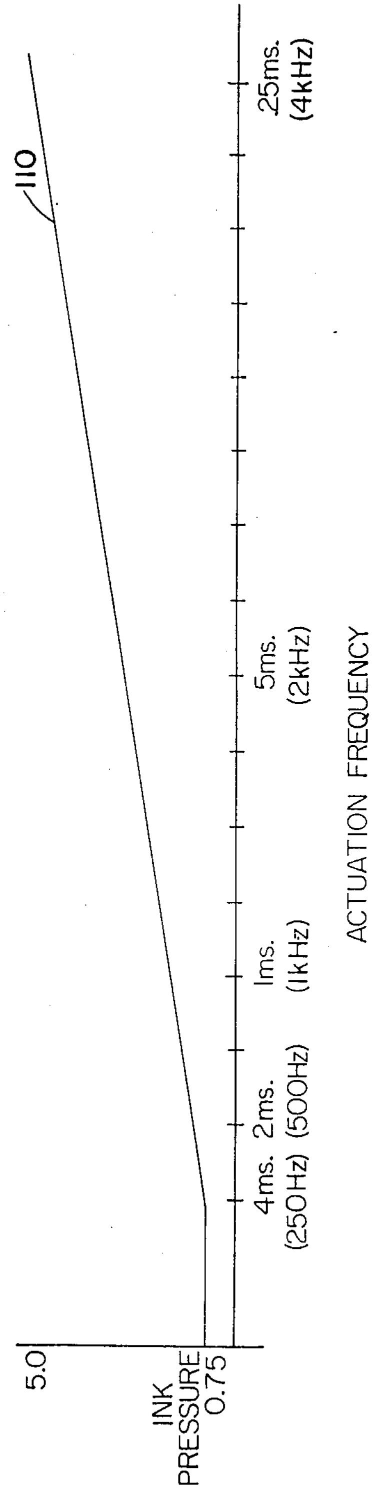
FIG. 3 is a diagram showing a representative relationship between the ink pressure at the printer head to produce ink drops having a consistent volume at each of a number of different actuation frequencies.

Referring to FIG. 3, the line 110 represents the magnitude of the ink pressure required at the input to the ink jet head to produce an ink drop having a consistent volume at each of a number of different actuation frequencies. for example, at lower dot generation rates the hydraulic circuit of the present invention provides a minimum pressure at the ink jet head of approximately 0.75 pounds per square inch (psi) for the ink jet head of FIGS. 1 and 2 to insure consistent volume drops at actuation frequencies ranging from 0 to approximately 250 dots/second to a maximum pressure of 5 psi for a dot generation rate of 4000 dots/second. A minimum pressure of 0.75 psi is maintained at the printer head during periods of zero dot generation to anticipate any delay in drop ejection due to fluid dynamics, etc. Consequently, the dynamic range over which an ink jet printer head ejects ink drops having substantially the same volume, is expanded through use of the hydraulic circuit of the present invention. The printer head operates satisfactority at higher actuation frequencies up to 4 Kilohertz and produces a greater surface area coverage per unit time than an equivalent ink jet printer head supplied with ink from a source without the hydraulic circuit.

In another preferred embodiment, the dot rate command signal which is related to the instantaneous rate at which dots are ejected from the printer head 24 in FIG. 1 and representative of the desired ink pressure at the input to the ink jet head is generated by the controller 42 as a digital word rather than a series of pulses 58 related to the timing pulses 44. A number of digital words are stored in the controller 42 and each digital word contains information related to the desired ink pressure at the ink jet held for an associated actuation frequency to produce the desired volume ink drop for the particular type ink jet printer head used. In. FIG. 1, the frequency-to-voltage converter 56 is replaced by a digital-to-analog converter which receives the digital words from the controller 42 and generates the appropriate analog signal on lead 62 representative of the desired pressure at the ink jet head. The particular arrangement and selection of circuit components and the derivation of the dot rate command signal may vary considerably without departing from the invention.

A hydraulic circuit for dynamically varying the pressure of writing fluid supplied to an ink jet printer head has been described in several preferred embodiments. Numerous changes and modifications may be made by those skilled in the art without departing from the spirit and scope of the invention and consequently, the invention has been described by way of illustration rather than limitation.

We claim:

1. A circuit for controlling the volume of drops ejected from an ink jet printer head by dynamically varying the pressure of writing fluid supplied to the ink jet printer head in response to timing pulses which may appear with variable amounts of time between successive ones of such pulses, said circuit comprising:

a pressurized source of writing fluid;

an ink jet printer head;

a fluid chamber having input means connected to said source of writing fluid and output means connected to said ink jet printer head, said fluid chamber further having pressure producing means for changing the pressure of the writing fluid in said fluid chamber;

a source of timing pulses, said timing pulses being associated with the instantaneous actuation frequency of the printer head and corresponding to the magnitude of a predeterminded fluid pressure at the ink jet printer head to produce an ink drop having a predetermined volume;

means for sensing the pressure of the writing fluid at said ink jet printer head and for generation a first pressure signal;

timing pulse responsive means for generating a second pressure signal in accordance with the number and frequency of said timing pulses, said second pressure signal being predetermined and representative of the predetermined fluid pressure required at the ink jet head corresponding to the instantaneous actuation frequency;

comparator means for comparing said first and second pressure signals to produce a pressure control signal prior to the ejection of ink drops at the instantaneous actuation frequency from said ink jet head, said pressure control signal being representative of the pressure difference between the sensed fluid pressure and the predetermined desired fluid pressure at said ink jet head, and driving means coupled to said fluid chamber pressure producing means and responsive to said pressure control signal for driving said pressurizing means to dynamically vary the pressure of the writing fluid in said fluid chamber to supply the writing fluid to said ink jet printer head at the predetermined desired pressure associated with the ink jet head actuation frequency whereby ink drops having a consistent volume are ejected from the ink jet head for each of a number of different instantaneous actuation frequencies.

2. A circuit for controlling the volume of drops ejected from an ink jet printer head by dynamically varying the pressure of writing fluid deleivered to the ink jet printer head as defined in claim 1 further characterized by said second pressure signal generating means including, frequency-to-voltage converting means coupled to said timing pulse source means for producing a first analog electrical signal, said first analog signal having a magnitude proportional to the predetermined desired writing fluid pressure at the ink jet head and corresponding to the instantaneous rate at which a sequence of drops is ejected from said ink jet head.

3. A circuit for controlling the volume of drops ejected from an ink jet printer head by dynamically varying the pressure of writing fluid delivered to the ink jet printer head as defined in claim 1 further characterized by said first pressure signal generating means including said pressure sensing means producing a second analog electrical signal, said second analog signal having a magnitude proportional to the pressure of the writing fluid present at the ink jet head during the ejection of a sequence of drops from the ink jet head.

4. A circuit for controlling the volume of drops ejected from an ink jet printer head by dynamically varying the pressure of writing fluid delivered to an ink jet printer head as defined in claim 1 further characterized by said fluid chamber pressure producing means including a diaphragm forming one side of said chamber and being movable for increasing and decreasing the volume of said chamber to vary the pressure of the fluid in said chamber.

5. A circuit for controlling the volume of drops ejected from an ink jet printer head by dynamically varying the pressure of writing fluid supplied to the ink jet printer head in response to timing pulses which may appear with variable amounts of time between successive ones of such pulses, said circuit comprising:

a pressurized source of writing fluid;

a large volume drop-on-demand ink jet printer head;

a fluid chamber having an inlet connected to said source of writing fluid and an outlet connected to said ink jet printer head, said chamber further having a compressible wall for varying the volume of the chamber and varying the pressure of writing fluid in the chamber, said fluid pressure being increased when said volume is decreased and said pressure being decreased when said volume is increased;

a source of timing pulses, said timing pulses being associated with the instantaneous actuation frequency of the printer head and corresponding to the magnitude of a predetermined fluid pressure at the ink jet printer head, said fluid pressure at the ink jet head being related to the actuation frequency, said pressure at the head being dynamically varies in accordance with a given actuation frequency to cause said ink jet head to eject drops with a predetermined, consistent volume for each of a number of ink jet head actuation frequencies when said head is excited at said frequency;

a pressure sensor located between said fluid chamber outlet and said ink jet head for sensing the pressure of the writing fluid at the head and for generating a first pressure signal;

frequency-to-voltage converting means coupled to said source of timing pulses for producing a first analog electrical signal in accordance with the number and frequency of the timing pulses, said first analog signal having a magnitude proportional to the predetermined fluid pressure associated with the actuation frequency at which a sequence of drops are ejected from the ink jet head;

buffer amplifier means coupled to said pressure sensor for receiving said first pressure signal and producing a second analog electrical signal, said second analog signal having a magnitude proportional to the pressure of the writing fluid at the ink jet head during the ejection of a sequence of drops from the ink jet head;

comparator means for comparing said first and second analog electrical signals to produce a pressure control signal representative of the pressure difference between the sensed fluid pressure and the predetermined fluid pressure at said ink jet head, and driving means responsive to said pressure control signal and coupled to the compressible wall of said fluid chamber for imparting movement to the wall in accordance with said pressure control signal to dynamically vary the pressure of the writing fluid at said ink jet printer head in accordance with the predetermined pressure associated with the instantanous actuation frequency whereby the volume of a drop ejected from said ink jet printer head is substantially the same over the range of ink jet head actuation frequencies.

6. A method for controlling the volue of drops ejected from an ink jet printer head by dynamically varying the pressure of writing fluid delivered to the ink jet printer head to cause the head to eject drops having a consistent volume over a range of ink jet head actuation frequencies, said method comprising the steps of:

producing a series of timing pulses which may appear with variable amounts of time between successive ones of such pulses, said timing pulses being associated with the instantaneous actuation frequency of the ink jet heads;

generating a fluid pressure signal corresponding to a present rate of drop ejection from the ink jet head;

generating an ink jet head predetermined fluid pressure signal associated with the pressure required at the head to eject a drop having a desired volume and in accordance with said timing pulses and corresponsing to a next rate of drop ejection from the ink jet head;

comparing the present rate and the next rate of drop ejection pressure signals to produce a pressure control signal prior to the ejection of ink drops at the instantaneous actuation frequency from the ink jet head, and dynamically varying the pressure of the writing fluid in said writing fluid source in response to said pressure control signal whereby the pressure of the writing fluid delivered to said ink jet head is at the predetermined fluid pressure associated with the instantaneous actuation frequency to cause the head to eject consistent volume drops at each rate of drop ejection.

* * * * *